J. ROGERS.
Oil Still.
No. 50,276.  Patented Oct. 3, 1865.
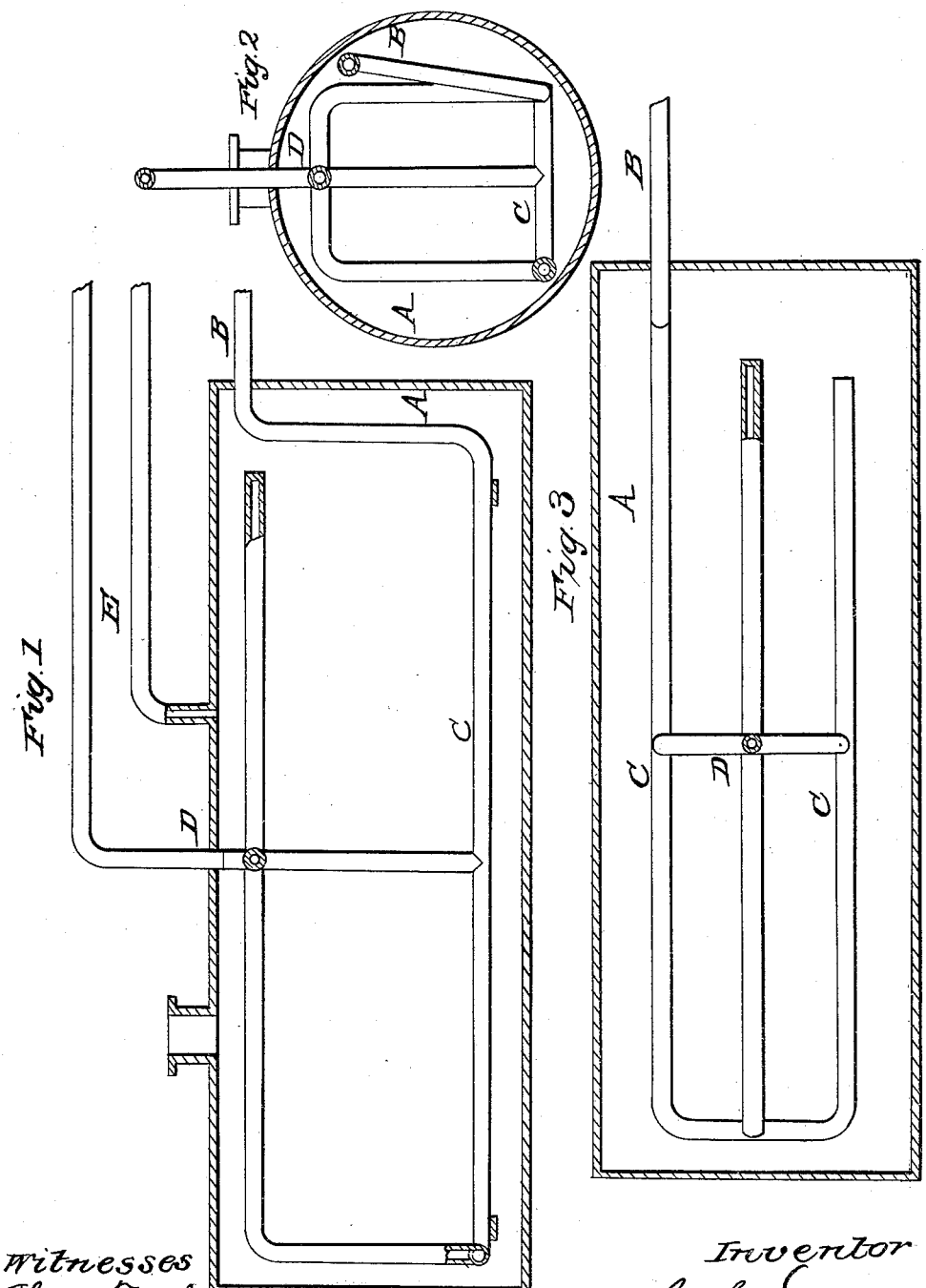

UNITED STATES PATENT OFFICE.

JOHN ROGERS, OF NEW YORK, N. Y.

IMPROVEMENT IN STILLS FOR DISTILLING PETROLEUM.

Specification forming part of Letters Patent No. 50,276, dated October 3, 1865.

*To all whom it may concern:*

Be it known that I, JOHN ROGERS, of No. 181 Pearl street, in the city, county, and State of New York, have invented a new and useful Improvement in Distilling Petroleum or other Hydrocarbon Liquids; and I do hereby declare that the following is a full, clear, and exact description thereof, which will enable others skilled in the art to make and use the same, reference being had to the accompanying drawings, forming part of this specification, in which—

Figure 1 represents a longitudinal central section of this invention. Fig. 2 is a transverse vertical section of the same. Fig. 3 is a horizontal section of the same.

Similar letters of reference indicate like parts.

This invention consists in the application of a series of pipes arranged in the interior of an ordinary still or retort, one pipe leading to the supply-tank containing the crude oil and other pipes being placed into the still near its exterior and just below its center, in combination with suitable escape-pipes, in such a manner that the crude oil, on being let into the still, has to pass through the heated pipes in the interior of the same, and during its passage through said pipes it is freed from its lightest or most volatile constituents. The operation of distilling can thus be continued without interruption, and much time and labor are saved.

A represents a still, which is horizontal and of that class at present generally used for distilling petroleum, though it must be remarked that my invention is applicable to stills of any description. This still connects by a pipe, B, with the supply-tank containing the crude oil, and the oil, running down through said pipe, passes into a series of pipes, C, which are arranged in the interior of the still near its exterior and just below its center. When an upright still is used these pipes form a coil passing round the inner surface of the still. These pipes, being situated in the interior of the still, are highly heated, and the benzine or other light and volatile parts of the petroleum or other liquid to be distilled pass off through a pipe, D, in the form of vapor. After passing through the entire length of the pipes C the oil is freed from its most volatile constituents and it discharges into the still, the discharge being regulated by means of a faucet, which may be applied to the inner end of the pipe C. The products of distillation escape through the pipe E.

By these means I am enabled to continue the operation of distilling without interruption. The light vapors being constantly allowed to escape, it is not necessary to stop and cool down. The fire can be kept going continually, and the product of distillation is fit for burning. The temperature of the still can be regulated so that the carbonization of a portion of the oil and the formation of an excessive quantity of tar are prevented, and the oil obtained from my still is of more uniform gravity and color than that obtained in ordinary distilling operations.

I claim as new and desire to secure by Letters Patent—

The within-described process of distilling petroleum or other hydrocarbon liquids by passing the crude oil through heated pipes or their equivalents in the interior of the still, for the purpose of freeing the same from their most volatile constituents, substantially as herein set forth.

JOHN ROGERS.

Witnesses:
M. M. LIVINGSTON,
C. L. TOPLIFF.